(12) United States Patent
Li et al.

(10) Patent No.: US 8,713,243 B2
(45) Date of Patent: Apr. 29, 2014

(54) REMOVABLE STORAGE DEVICE AND METHOD FOR IDENTIFYING DRIVE LETTER OF THE REMOVABLE STORAGE DEVICE

(75) Inventors: Yan Li, Shenzhen (CN); De-Hua Dang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 280 days.

(21) Appl. No.: 13/216,261

(22) Filed: Aug. 24, 2011

(65) Prior Publication Data

US 2012/0124288 A1 May 17, 2012

(30) Foreign Application Priority Data

Nov. 11, 2010 (CN) .......................... 2010 1 0539951

(51) Int. Cl.
*G06F 12/00* (2006.01)
*G06F 13/00* (2006.01)
*G06F 13/28* (2006.01)

(52) U.S. Cl.
USPC ............ 711/103; 711/111; 711/154; 711/170

(58) Field of Classification Search
USPC .................................. 711/103, 111, 154, 170
See application file for complete search history.

(56) References Cited

U.S. PATENT DOCUMENTS

| | | | | |
|---|---|---|---|---|
| 5,896,546 | A * | 4/1999 | Monahan et al. | 710/10 |
| 2002/0078335 | A1* | 6/2002 | Cabrera et al. | 713/1 |
| 2002/0198865 | A1* | 12/2002 | Rafanello | 707/1 |
| 2005/0045721 | A1* | 3/2005 | Wang et al. | 235/440 |
| 2006/0006233 | A1* | 1/2006 | Chang et al. | 235/441 |
| 2009/0259771 | A1* | 10/2009 | Tanik et al. | 710/3 |
| 2009/0287897 | A1* | 11/2009 | Horibe et al. | 711/167 |

FOREIGN PATENT DOCUMENTS

| | | |
|---|---|---|
| CN | 1388447 A | 1/2003 |
| CN | 101216776 A | 7/2008 |
| CN | 101593117 A | 12/2009 |

OTHER PUBLICATIONS

Johnson, Bary, Memorex Offers USB Flash Drive with LCD Display, Oct. 13, 2005, PCMAG, Available at: http://www.pcmag.com/article2/0,2817,1871121,00.asp.*

* cited by examiner

*Primary Examiner* — Ryan Bertram
(74) *Attorney, Agent, or Firm* — Novak Druce Connolly Bove + Quigg LLP

(57) ABSTRACT

A method for physically identifying an association between a removable storage device and its assigned drive letter, the removable storage device connecting to a computing device. A data structure which comprises the drive letter assigned by an operating system of the computing device is received and analyzed to retrieve the drive letter assigned to the removable storage device. The drive letter of the removable storage device is displayed on a screen of the removable storage device or on a display device connected to the removable storage device.

6 Claims, 4 Drawing Sheets

REMOVABLE STORAGE DEVICE AND METHOD FOR IDENTIFYING DRIVE LETTER OF THE REMOVABLE STORAGE DEVICE

BACKGROUND

1. Technical Field

Embodiments of the present disclosure generally relate to storage devices, and more particularly to a removable storage device and a method for identifying an assigned drive letter of the removable storage device.

2. Description of Related Art

Usually, if more than one removable storage device are connected to a computing device, it is difficult to identify associations of the storage devices and drive letters assigned to the storage devices. For example, if there are four removable storage devices connected to the computing device, and the drive letters assigned by an operating system of the computing device are "E", "F", "G", and "H", without drive letters being displayed on the devices, it is difficult to easily identify which device corresponds to which drive letter.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
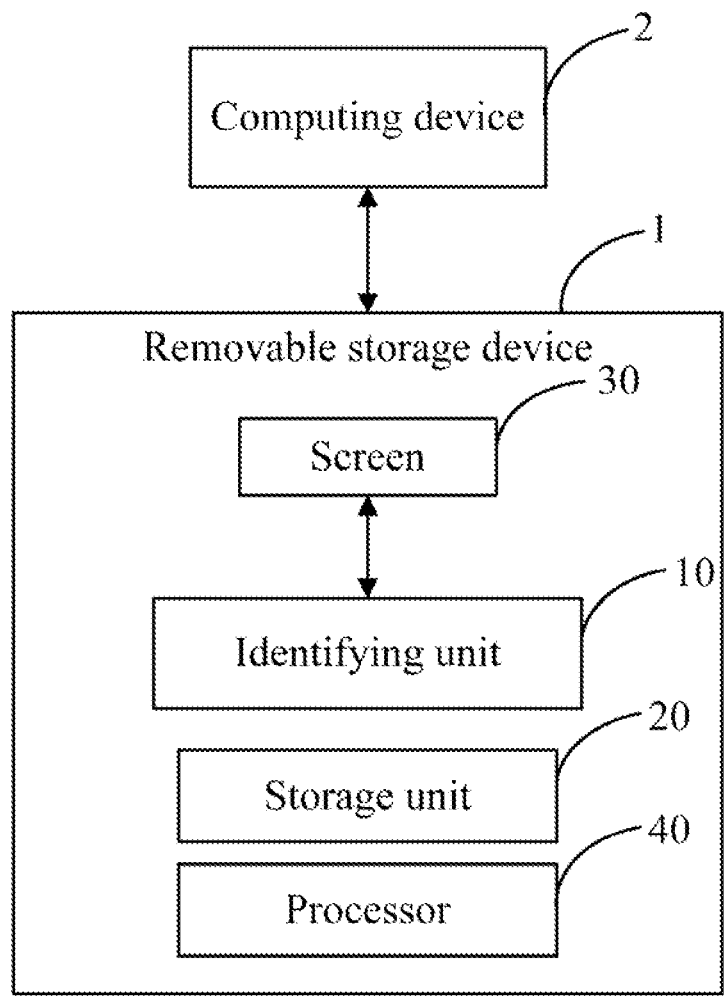
FIG. 1 is a block diagram of a first embodiment of a removable storage device including an identifying unit.
Figure 2:
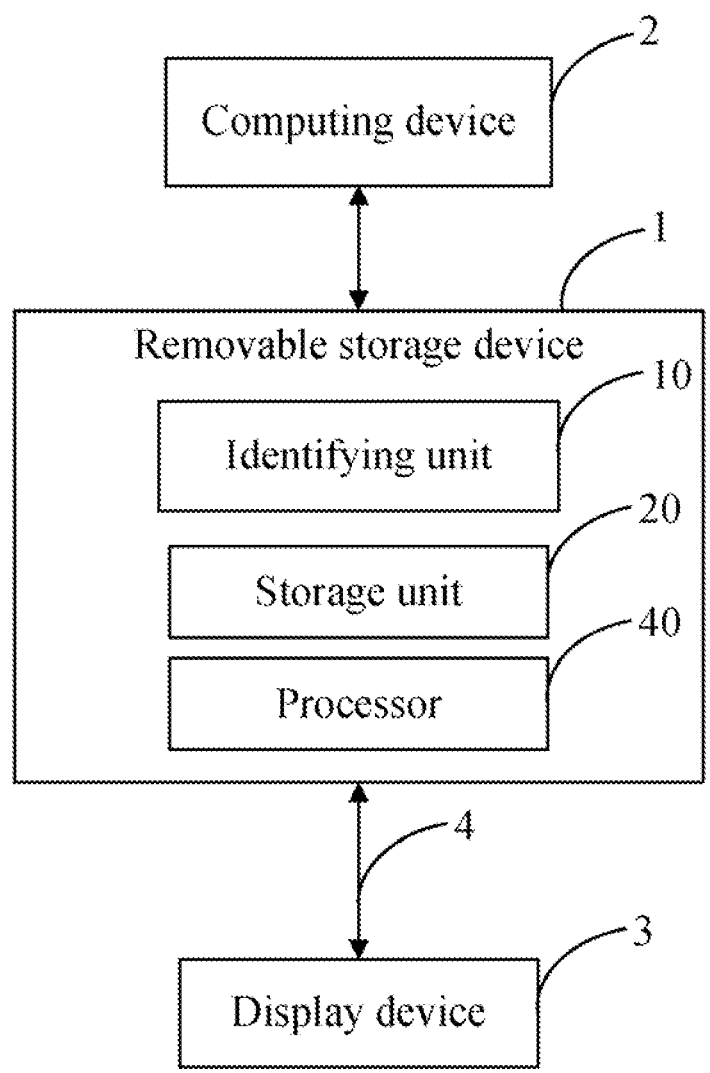
FIG. 2 is a block diagram of a second embodiment of a removable storage device including an identifying unit.

FIG. 1 is a block diagram of a first embodiment of a removable storage device 1 (hereinafter "the device 1") and FIG. 2 is a block diagram of a second embodiment of the device 1. The difference between the first embodiment and the second embodiment is that the first embodiment of FIG. 1 includes a screen 30 built into the device 1, and in the second embodiment, the screen 30 is omitted, but a peripheral display device 3 is connected to the device 1. In both embodiments the device 1 includes an identifying unit 10 for identifying an assigned drive letter of the device 1. One or more of the device 1 can be electrically connected to a computing device 2 through a universal serial bus (USB) port (not shown), for example. The device 1 may be a USB flash disk, a mobile hard disk, or similar removable device. The device 1 further includes a storage unit 20 and a processor 40.

The drive letter is assigned to the device 1 by an operating system of the computing device 2 when the device 1 is connected to the computing device 2. The drive letter, as an example, may be A, B, C.

Figure 3:
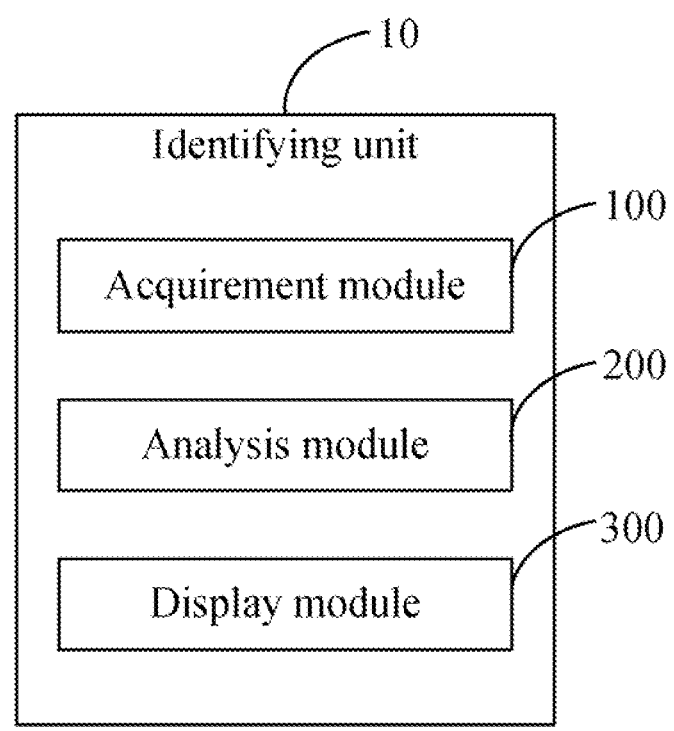
FIG. 3 is a block diagram of one embodiment of function modules of the identifying unit.

In one embodiment, the identifying unit 10 may include one or more function modules (detailed description is given in FIG. 3). The one or more function modules may comprise computerized code in the form of one or more programs that are stored in the storage unit 20, and executed by the processor 40 of the device 1 to provide the functions of the identifying unit 10 described later. The storage unit 20 may be a cache or a memory, such as an EPROM or flash memory.

FIG. 3 is a block diagram of one embodiment of the function modules of the identifying unit 10. In one embodiment, the identifying unit 10 includes an acquirement module 100, an analysis module 200, and a display module 300.

The acquirement module 100 is operable to acquire information about the device 1 from the computing device 2. The information about the device 1 may include a name, an identification (ID), and the drive letter assigned by the operating system of the computing device 2. In one embodiment, device drivers of the operating system that correspond to the USB ports start when the computing device 2 starts. The device drivers monitor the computing device 2 and acquire the assigned drive letter of the device 1 when the device 1 is connected to the computing device 2. The drivers package the assigned drive letter, the name, and the ID in a data structure, and then send the data structure to the acquirement module 100. The data structure is an organizational form of data transmitted between the drivers and the device 1. Any data can be packaged and written into the data structure.

The analysis module 200 is operable to analyze the received data structure to retrieve the drive letter assigned to the device 1. In one embodiment, the received data structure may comprise definitions as shown below:

```
typedef struct Drive_Info
{
    char drive_name[64];
    char drive_letter[2];
    char drive_id[64];
    ...
},
``` where the above definition "drive_letter[2]" is regarding the drive letter assigned to the device 1.

The display module 300 is operable to display the drive letter of the device 1 on the screen 30 or the display device 3.

Figure 4:
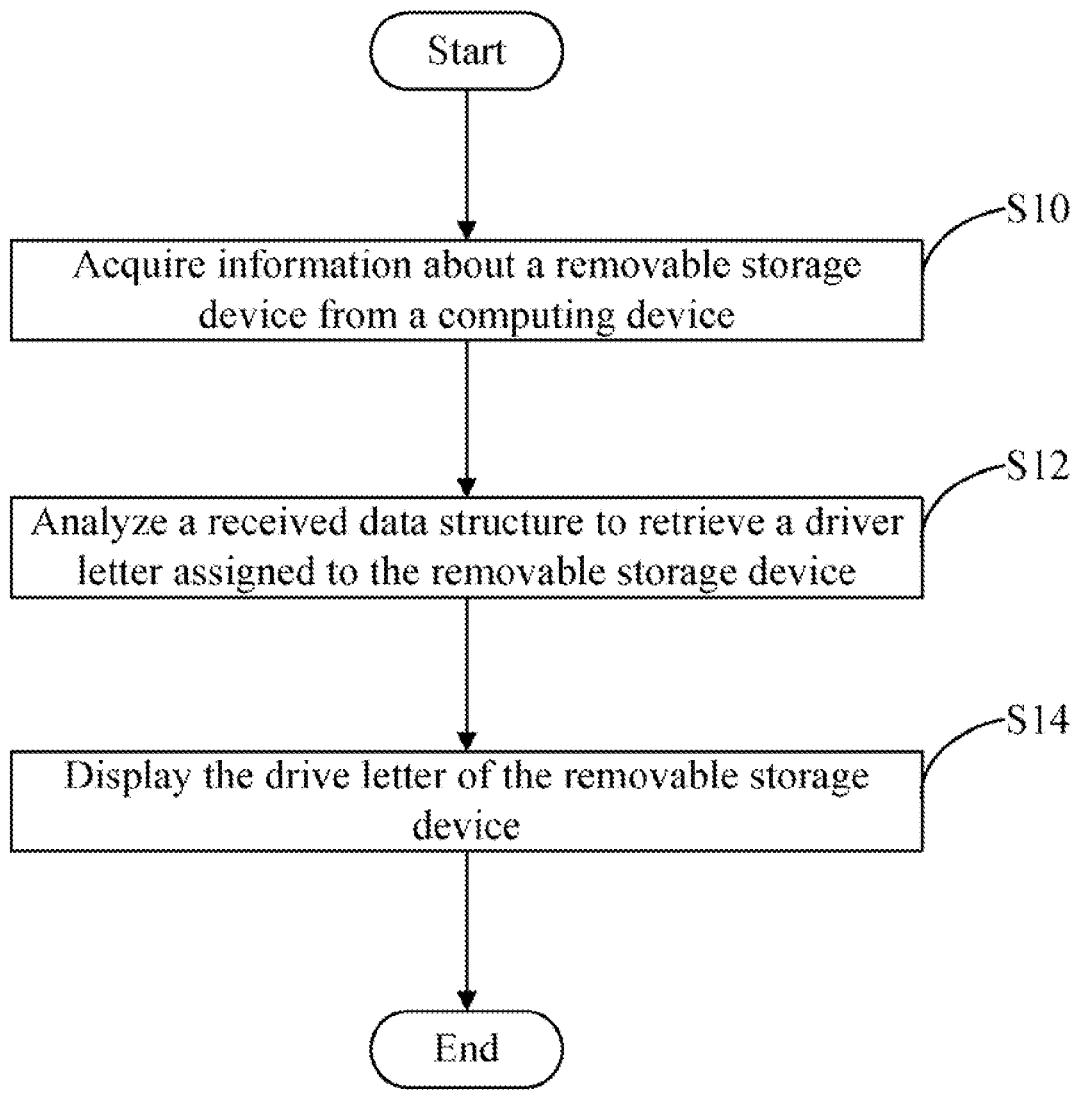
FIG. 4 is a flowchart of one embodiment of a method for identifying an assigned drive letter of the removable storage device.

FIG. 4 is a flowchart of one embodiment of a method for identifying an assigned drive letter of the device 1. Depending on the embodiment, additional blocks may be added, others removed, and the ordering of the blocks may be changed.

In block S10, the acquirement module 100 acquires information about the device 1 from the computing device 2. The information about the device 1 may include a name, an ID, and the drive letter assigned by the operating system of the computing device 2. In one embodiment, device drivers of the operating system that correspond to the USB ports start when the computing device 2 starts. The device drivers monitor the computing device 2 and acquire the assigned drive letter of the device 1 when the device 1 is connected to the computing device 2. The drivers package the assigned drive letter, the name, and the ID in a data structure, and then send the data structure to the acquirement module 100.

In block S12, the analysis module 200 analyzes the received data structure to retrieve the drive letter assigned to the device 1.

In block S14, the display module 300 displays the drive letter of the device 1 on the screen 30 or the display device 3.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A computer-implemented method for identifying an assigned drive letter of a removable storage device, the removable storage device in electronic communication with a computing device, the method comprising:
   (a) acquiring information about the removable storage device by a processor of the removable storage device from a data structure sent by the computing device;
   (b) analyzing the information acquired from the data structure by the processor of the removable storage device to retrieve a drive letter assigned to the removable storage device by the computing device,
   (c) displaying the drive letter of the removable storage device on a screen built into the removable storage device or a display device connected to the removable storage device; and
   wherein the information about the removable storage device comprising comprises a name, an identification (ID), and the drive letter assigned by an operating system of the computing device.

2. The computer-implemented method as claimed in claim 1, wherein the assigned drive letter, the name, and the ID is packaged and written into the data structure by drivers in the operating system, and then sent to the removable storage device.

3. A non-transitory storage medium storing a set of instructions, the set of instructions capable of being executed by a processor of a removable storage device to perform a computer-implemented method for identifying an assigned drive letter of the removable storage device, the removable storage device in electronic communication with a computing device, the method comprising:
   (a) acquiring information about the removable storage device in a data structure received from the computing device;
   (b) analyzing the information acquired from the data structure to retrieve a drive letter assigned to the removable storage device by the computing device,
   (c) displaying the drive letter of the removable storage device on a screen built into the removable storage device or a display device connected to the removable storage device;
   wherein the information about the removable storage device comprising a name, an identification (ID), and the drive letter assigned by an operating system of the computing device.

4. The non-transitory storage medium as claimed in claim 3, wherein the assigned drive letter, the name, and the ID is packaged and written into the data structure by drivers in the operating system, and then sent to the removable storage device.

5. A removable storage device, the removable storage device in electronic communication with a computing device, the removable storage device comprising:
   a storage unit; at least one processor; and
   one or more programs stored in the storage unit, executable by the at least one processor, the one or more programs comprising:
   an acquirement module operable to acquire information about the removable storage device in a data structure from the computing device;
   an analysis module operable to analyze the information acquired from the data structure to retrieve a drive letter assigned to the removable storage device by the computing device,
   a display module operable to display the drive letter of the removable storage device on a screen built into the removable storage device or a display device connected to the removable storage device; and
   wherein the information about the removable storage device comprising a name, an identification (ID), and the drive letter assigned by an operating system of the computing device.

6. The removable storage device as claimed in claim 5, wherein the assigned drive letter, the name, and the ID is packaged and written into the data structure by drivers in the operating system, and then sent to the removable storage device.

* * * * *